United States Patent
Liu et al.

(10) Patent No.: US 8,155,249 B2
(45) Date of Patent: Apr. 10, 2012

(54) APPARATUS OF MAXIMUM LIKELIHOOD SIGNAL DETECTION

(75) Inventors: Pi-Hai Liu, Taipei (TW); Meng-Ta Yang, Miao Li Hsien (TW)

(73) Assignee: Mediatek Incorporation, Hsin-Chu (TW)

( * ) Notice: Subject to any disclaimer, the term of this patent is extended or adjusted under 35 U.S.C. 154(b) by 0 days.

(21) Appl. No.: 13/010,434

(22) Filed: Jan. 20, 2011

(65) Prior Publication Data

US 2011/0110469 A1    May 12, 2011

Related U.S. Application Data

(63) Continuation of application No. 11/652,500, filed on Jan. 12, 2007, now Pat. No. 7,894,553.

(30) Foreign Application Priority Data

Jan. 13, 2006  (TW) ................ 95101469 A (51) Int. Cl.
*H04L 27/06* (2006.01)

(52) U.S. Cl. ........................................ 375/341
(58) Field of Classification Search .............. 375/262, 375/341; 714/794
See application file for complete search history.

(56) References Cited

U.S. PATENT DOCUMENTS

| | | | |
|---|---|---|---|
| 6,674,816 B2 * | 1/2004 | Shieh ................. | 375/341 |
| 7,536,630 B2 * | 5/2009 | Chun et al. ........... | 714/790 |
| 2004/0255230 A1 | 12/2004 | Chen et al. | |
| 2005/0034051 A1 * | 2/2005 | Chun et al. ........... | 714/795 |

* cited by examiner

*Primary Examiner* — Sam K Ahn
(74) *Attorney, Agent, or Firm* — Birch, Stewart, Kolasch & Birch, LLP (57) ABSTRACT

An apparatus for maximum likelihood signal detection comprises a reference data unit, a branch metric unit, an add-compare-select unit, a path metric unit and a path memory, and is used for detecting maximum likelihood signal. The reference information unit, the branch metric unit, the add-compare-select unit or the path metric unit can further comprise a multiplexer to removing unnecessary paths according to a control signal. The control signal is adjusted according to channel response, coding constraint or channel memory length.

8 Claims, 13 Drawing Sheets

APPARATUS OF MAXIMUM LIKELIHOOD SIGNAL DETECTION

CROSS REFERENCE TO RELATED APPLICATIONS

This application is a Continuation of application Ser. No. 11/652,500, filed Jan. 12, 2007, now U.S. Pat. No. 7,894,553 B2, which claims priority of Taiwan Patent Application No. 95101469, filed on Jan. 13, 2006, the entirety of which is incorporated by reference herein.

BACKGROUND OF THE INVENTION

1. Field of the Invention

The invention relates to an apparatus of maximum likelihood signal detection, and more particularly to an apparatus that realizes maximum likelihood detection for detecting signals with different characteristics. The apparatus of maximum likelihood signal detection can be used to detect signals with different channel responses, coding constraints and channel memory lengths.

2. Description of Related Art

A conventional apparatus of maximum likelihood signal detection makes use of the Viterbit algorithm for signal detection or decoding, and is thus also called a Viterbit decoder or a Viterbit detector. The conventional Viterbit algorithm is usually used in communication systems or data storage systems, and can be used for decoding of convolutional codes, detection of baseband signals of wireless communication systems or detection of data recorded on a harddisk.

With gradual popularity of optical discs in recent years, the demand of increasing the capacity of optical discs rises more and more. In order to increase the data capacity of optical discs, many specifications of optical discs have been worked out, e.g., VCD, DVD, HDDVD and Blue-ray disc. However, because optical discs generally record data with lands and pits, in order to meet the demand of increasing capacities of optical discs, the formed lands and pits will be denser. Hence it makes reading of the data from the optical disk becoming more difficult. Therefore, in orders to conquer the problem of data reading, manufacturers utilize partial response maximum likelihood (PRML) devices with the Viterbit decoder for data detection.

Figure 1:
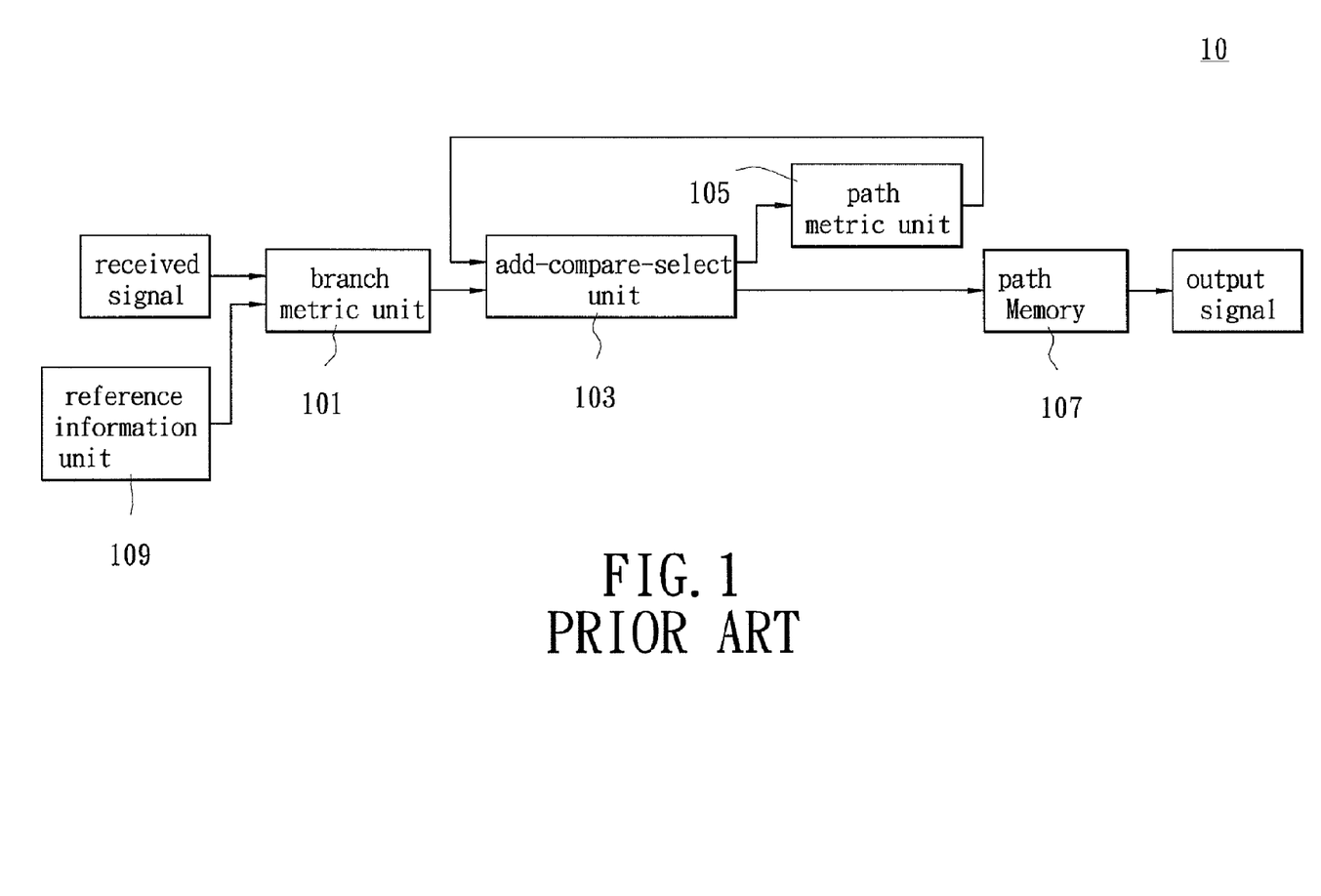
FIG. 1 is a block diagram of a conventional Viterbit decoder applied in a partial response maximum likelihood device.

FIG. 1 is a block diagram of a conventional Viterbit decoder applied in a partial response maximum likelihood device. As shown in FIG. 1, a Viterbit decoder 10 comprises a branch metric unit 101, an add-compare-select unit 103, a path metric unit 105, a path memory 107 and a reference information unit 109.

The branch metric unit 101 is used for receiving reference information outputted by the reference information unit 109 and a sampled data signal to calculate out a first calculation value and also for outputting the first calculation value to the add-compare-select unit 103. The reference information is a reference signal level of a branch. The first calculation value is a branch metric of the branch. The add-compare-select unit 103 performs addition, comparison and selection actions to generate a second calculation value (i.e., a survival path metric), and transmits the survival path metric to the path metric unit 105 to update the path metric stored in the path metric unit 105.

The add-compare-select unit 103 will retrieve the latest path metric from the path metric unit 105 to perform addition, comparison and selection actions so as to generate the next second calculation value. Besides, the add-compare-select unit 103 will also transmit its determination result (i.e., a determination bit) to the path memory 107 to temporarily store the survival path into the path memory 107. Next, the path memory 107 will output the path data to a next-stage device for subsequent data processing. Generally, the addition, comparison and selection actions of the add-compare-select unit 103 are carried out in turn. But some methods, however, the addition action and comparison action are performed parallel to enhance the operational speed. Although various embodiments of the invention are exemplified with the add-compare-select unit, the invention also applies to these kinds of methods with faster operational speeds.

Data signals reproduced from various optical discs, however, may have different characteristics, for example, different channel responses, different coding constraints or different channel memory lengths. In the prior art, various maximum likelihood signal detection apparatuses are therefore used for respectively processing the received data signals from those optical discs, hence easily resulting in waste of resources and increase of the manufacturing cost.

SUMMARY OF THE INVENTION

The primary object of the invention is to provide an apparatus for maximum likelihood signal detection, which is used to realize maximum likelihood detection to detect signals with different characteristics. The apparatus of maximum likelihood signal detection can be used to detect signals with different channel responses, coding constraints and channel memory lengths.

Another object of the invention is to provide an apparatus of maximum likelihood signal detection, which is used to realize maximum likelihood detection and can read two-bit data at a time by using a trellis diagram with a number of read bit M=2.

In order to achieve the above objects, the invention provides an apparatus of maximum likelihood signal detection, which comprises a reference information unit for generating a reference signal, a branch metric unit for receiving an input signal and the reference signal to generate a first branch metric, an add-compare-select unit for receiving the first branch metric and performing addition, comparison and selection actions to generate a survival path metric and a determination bit, a path metric unit for storing the survival path metric, and a path memory for storing the determination bit generated by the add-compare-select unit.

The branch metric unit comprises a branch meter for generating a second branch metric according to the input signal and the reference signal, and comprises a multiplexer for outputting the second branch metric or a predetermined branch metric to be the first branch metric according to a control signal. The control signal can be adjusted according to the corresponding condition of the input signal. The corresponding condition comprises channel response, coding constraint or channel memory length.

To achieve the above objects, the invention also provides an apparatus for maximum likelihood signal detection, which comprises a reference information unit for generating a first reference signal, a branch metric unit for receiving an input signal and the first reference signal to generate a branch metric, an add-compare-select unit for receiving the branch metric and performing addition, comparison and selection actions to generate a survival path metric and a determination bit, a path metric unit for storing the survival path metric, and a path memory for storing the determination bit.

The reference information unit comprises a reference signal generator for generating a second reference signal according to the input signal, and a multiplexer for outputting the second reference signal or a predetermined reference signal to be the first reference signal according to a control signal. The control signal can be adjusted according to the corresponding condition of the input signal. The corresponding condition comprises channel response, coding constraint or channel memory length.

In order to achieve the above objects, the invention also provides an apparatus for maximum likelihood signal detection, which comprises a reference information unit for generating a reference signal, a branch metric unit for receiving an input signal and the reference signal to generate a first branch metric, an add-compare-select unit receiving a second branch metric and performing addition, comparison and selection actions to generate a survival path metric and a determination bit, a path metric unit for storing the survival path metric, and a path memory for storing the determination bit.

The add-compare-select unit further comprises a multiplexer for outputting the first branch metric or a predetermined input value according to a control signal. The control signal can be adjusted according to the corresponding condition of the input signal. The corresponding condition comprises channel response, coding constraint or channel memory length.

In order to achieve the above objects, the invention also provides an apparatus for maximum likelihood signal detection, which comprises a reference information unit for generating a reference signal, a branch metric unit for receiving an input signal and the reference signal to generate a branch metric, an add-compare-select unit for receiving the branch metric and performing addition, comparison and selection actions to generate a survival path metric and a determination bit, a path metric unit for storing the survival path metric, and a path memory for storing the determination bit.

The path metric unit comprises a path metric memory for storing the survival path metric, and a multiplexer for outputting the stored path metric or a predetermined path metric to the add-compare-select unit according to a control signal. The control signal can be adjusted according to the corresponding condition of the input signal. The corresponding condition comprises channel response, coding constraint or channel memory length.

BRIEF DESCRIPTION OF THE DRAWINGS

The various objects and advantages of the invention will be more readily understood from the following detailed description when read in conjunction with the appended drawing, in which.

DETAILED DESCRIPTION OF THE PREFERRED EMBODIMENTS

The invention discloses an apparatus for maximum likelihood signal detection, which detects signals with various channel responses, coding constraints and/or channel memory lengths read from optical discs of different specifications according to the maximum likelihood detection theory. The invention combines various trellis diagrams of various signals read from optical discs of different specifications to lower the complexity of hardware or software system.

Figure 2:
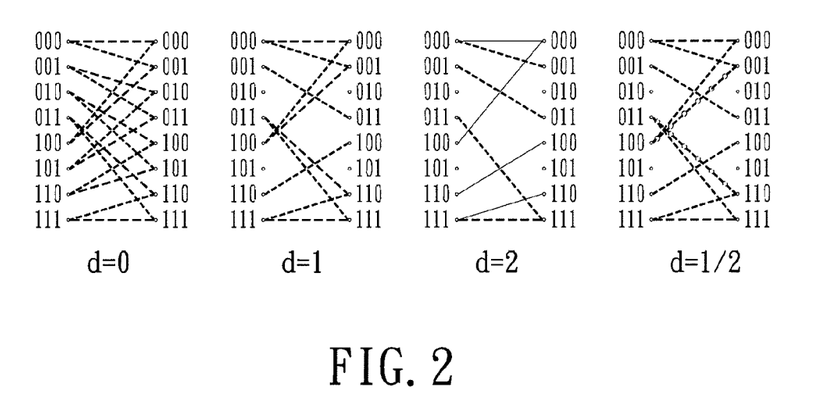
FIG. 2 shows trellis diagrams of the invention with a channel memory length n=3 and a coding constraint d=0, 1, 2, and 1/2, respectively.

FIG. 2 shows trellis diagrams of the invention with a channel memory length n=3 and a coding constraint d=0, 1, 2, or 1/2, respectively. The channel memory length is used to describe the size of a laser light spot provided by the pickup head on the optical disc. A channel memory length of n=3 means the size of the spot covering three bits data on the disk.

The coding constraint is also called a run length limited (RLL), and is used to limit the number of consecutive "0" (i.e., pits) or "1" (i.e., land) in the data string so as to facilitate discrimination of the data. A coding constraint of d=0 means the data can be arranged freely, a coding constraint of d=1 means the data must have at least two consecutive "0" or "1", a coding constraint of d=2 means the data must have at least three consecutive "0" or "1". It should be noted that the trellis diagram with a coding constraint d=1/2 in FIG. 2 illustrate the combination of the trellis diagrams with a coding constraint d=1 and d=2.

Using the trellis diagram with a channel memory length n=3 and a coding constraint d=0 in FIG. 2 as an example, the left side shows the possible states at a first time point, while the right side shows the possible states at a second time point. Moving the light spot from the position at the first time point to the position at the second time point represents the light spot shifts a one-bit length on the optical disc. The coding constraint d=0 in this trellis diagram means that the data can be arranged freely. Therefore, each state at the first time point can generate two branches respectively pointing toward the states at the second time point.

Using the trellis diagram with a channel memory length n=3 and a coding constraint d=1 in FIG. 2 as an example, the coding constraint d=1 in this trellis diagram represents that the data must have at least two consecutive "0" or "1". Therefore, both the states of first time point and the states of second time point of this trellis diagram have two non-existent data states (i.e., data states having no branch connections).

Similarly, using the trellis diagram with a channel memory length n=3 and a coding constraint d=2 in FIG. 2 as an example, the coding constraint d=2 in this trellis diagram represents the data must have at least three consecutive "0" or "1". Therefore, both the states of first time point and the states of second time point of this trellis diagram have two non-existent data states. Besides, because the coding constraint d=2 is more stringent than the coding constraint d=1, hence, the trellis diagram with a coding constraint d=2 has less branches. Moreover, because the trellis diagram of the coding constraint d=2 conforms to the trellis diagram of coding constraint d=1. In the other word, the branches existing in the trellis diagram with a coding constraint d=2 will surely exist in the trellis diagram with a coding constraint d=1.

In consideration of the above statements, the invention combines these two trellis diagrams with different coding constraints d=1 and d=2 into a trellis diagram with a coding constraint d=1/2. In the trellis diagram with a coding constraint d=1/2, most of the branches are common branches for the trellis diagram with a coding constraint d=2 and the trellis diagram with a coding constraint d=1. There are only two different branches marked by circle symbols in FIG. 2 which is used only for the trellis diagram with a coding constraint d=1. Therefore, by applying or masking these two branches, the trellis diagram with a coding constraint d=1/2 can be converted to the trellis diagram with a coding constraint d=1 or the trellis diagram with a coding constraint d=2.

Figure 3:
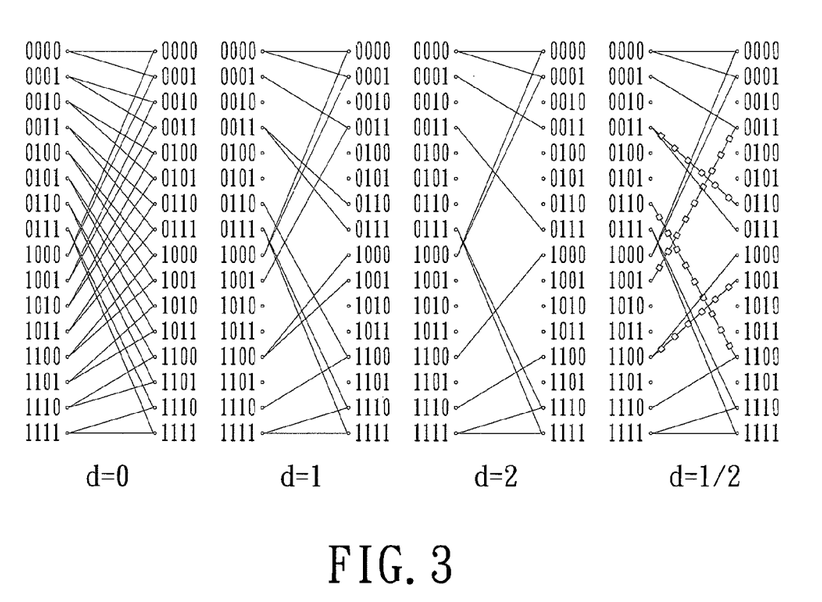
FIG. 3 shows trellis diagrams of the invention with a channel memory length n=4 and a coding constraint d=0, 1, 2, and 1/2, respectively.

FIG. 3 shows trellis diagrams of the invention with a channel memory length n=4 and a coding constraint d=0, 1, 2, and 1/2, respectively. FIG. 3 is quite similar to FIG. 2. They only differ in that there are more data states and thus more complex branch connections in FIG. 3. In the trellis diagram with a coding constraint d=0, because the data can be arranged freely, the data state covered at each first time point can generate two branches respectively pointing toward the data state covered at the second time point.

In the trellis diagram with a coding constraint d=1 in FIG. 3, the coding constraint d=1 means that the data must have at least two consecutive "0" or "1". Therefore, both the states of first time point and the states of second time point in this trellis diagram have six non-existent data states (i.e., data states having no branch connections). Similarly, in the trellis diagram with a coding constraint d=2, the coding constraint d=2 means the data must have at least three consecutive "0" or "1". Therefore, both the states of first time point and the states of second time point in this trellis diagram have eight non-existent data states.

Generally, the trellis diagram can be defined in two ways. First, the trellis diagram is defined by that the reference signal has relationship with the latest data. Or, the trellis diagram is defined by that the reference signal has not relationship with the latest data. These two kinds of trellis diagrams make different definitions to the channel memory length n. No matter which kind of trellis diagram is applied, all the embodiments of the invention can be applied. For the sake of brevity, only one of them will be described herein in detail.

In FIG. 3, the trellis diagrams with coding constraints d=1 and d=2 are combined to form the trellis diagram with a coding constraint d=1/2. In the trellis diagram with a coding constraint d=1/2, most of the branches are common branches for the trellis diagram with a coding constraint d=2 and the trellis diagram with a coding constraint d=1. There are only four different branches marked by square symbols in FIG. 3 which is used only for the trellis diagram with a coding constraint d=1. Therefore, by applying or masking these four branch connections, the trellis diagram with a coding constraint d=1/2 can be converted to the trellis diagram with a coding constraint d=1 or the trellis diagram with a coding constraint d=2.

Although the data encoding method for data stored on optical discs are generally using RLL codes. But, there are various RLL codes coding constraint for the various optical discs with different specifications. For instance, the coding constraint is equal to 0, 1 or 2. Therefore, the conventional optical disc drives usually have to use multiple maximum likelihood signal detection apparatuses or Viterbit detectors to restore the data recorded on an optical disc according to different trellis diagrams. In the invention, by using the trellis diagram with a coding constraint d=1/2 and by applying or masking different branch connections, the apparatus for maximum likelihood signal detection of the invention can suitable for reading various optical discs with different coding constraints (RLL codes).

Figure 4:
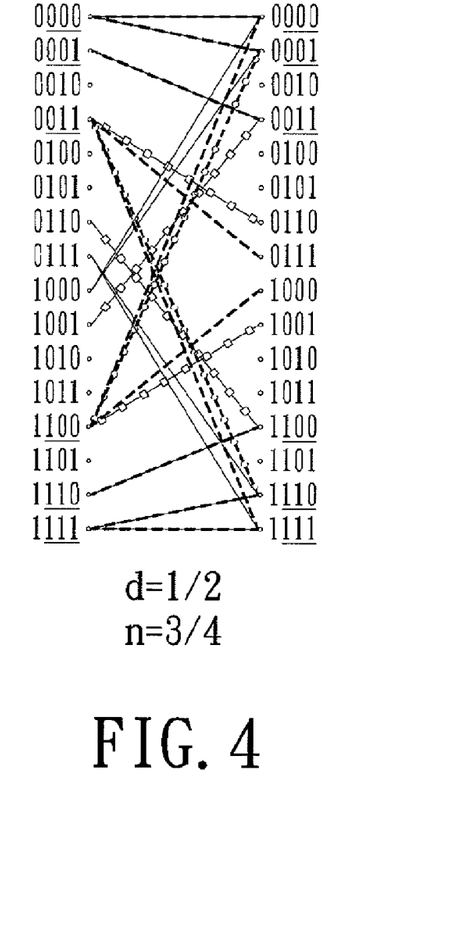
FIG. 4 shows trellis diagrams of the invention with a channel memory length n=3, 4 and 3/4 and a coding constraint d=1/2, respectively.

In order to make the apparatus for maximum likelihood signal detection of the invention apply to optical discs with different channel memory lengths, the invention further combine the trellis diagrams shown in FIG. 2 and FIG. 3 to form the trellis diagrams shown in FIG. 4. FIG. 4 shows trellis diagrams of the invention with a channel memory length n=3, 4 and 3/4 and a coding constraint d=1/2, respectively. The trellis diagram with a coding constraint d=1/2 and a channel memory length n=3/4 in FIG. 4 is formed by the combination of the trellis diagrams with a coding constraint d=1/2 and a channel memory length n=3 and n=4. In other word, the trellis diagram in FIG. 4 is formed by the trellis diagram with a coding constraint d=1/2 and a channel memory length n=3 in FIG. 2 and the trellis diagram with a coding constraint d=1/2 and a channel memory length n=4 in FIG. 3.

Specially, the left and right sides of the trellis diagram shown in FIG. 4 illustrate the data states of the channel memory length n=4 by four bits and illustrate the data states of the channel memory length n=3 by three bits marked by underlines.

As shown in FIG. 4, if an optical disc has a channel memory length n=4 and a coding constraint d=2, the branch connections marked by square symbols and the branch connections only for the channel memory length n=3 can be masked. If an optical disc has a channel memory length n=4 and a coding constraint d=1, the branch connections marked by square symbols can be applied, while the branch connections only for the channel memory length n=3 can be masked.

Similarly, if an optical disc has a channel memory length n=3 and a coding constraint d=2, the branch connections marked by circle symbols and the branch connections only for the channel memory length n=4 can be masked. If an optical disc has a channel memory length n=3 and a coding constraint d=1, the branch connections marked by circle symbols can be applied, while the branch connections only for the channel memory length n=4 can be masked.

However, the trellis diagram with a coding constraint d=1/2 and a channel memory length n=3/4 in FIG. 4 increase the number of branch connections toward the data state at the second time point, i.e. the maximum number of branch connections toward the data state at the second time point become three. This will make the design of an add-compare-select unit of the invention become more complex.

Figure 5:
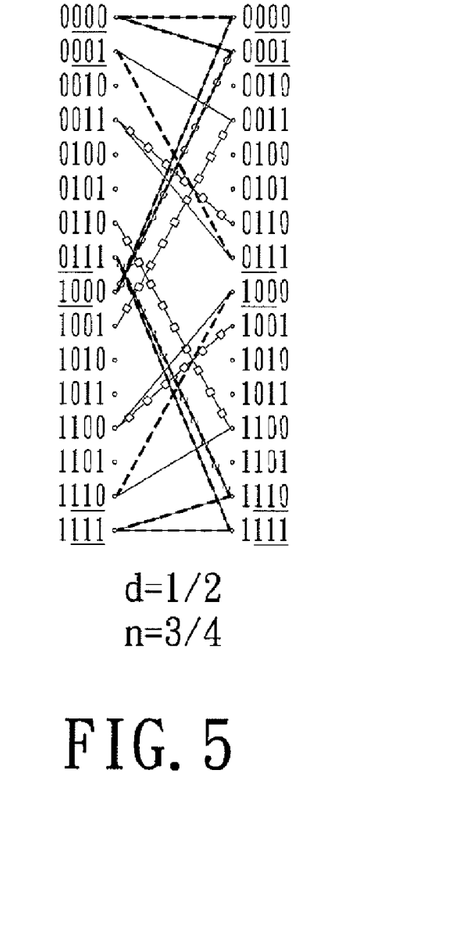
FIG. 5 shows a trellis diagram of the invention with a channel memory length n=3/4 and a coding constraint d=1/2.

FIG. 5 shows another trellis diagram of the invention with a channel memory length n=3/4 and a coding constraint d=1/2. Comparing to the trellis diagram shown in FIG. 4, this trellis diagram can reduce the design complexity of the invention. Similarly to FIG. 4, the left and right sides of the trellis diagram in FIG. 5 illustrate the data states of the channel memory length n=4 by four bits and illustrate the data states of the channel memory length n=3 by three bits marked by underlines. Because the trellis diagram in FIG. 5 decreases the maximum number of branch connections toward the data state at the second time point to two, the design complexity of the invention can be reduced.

Figure 6A:
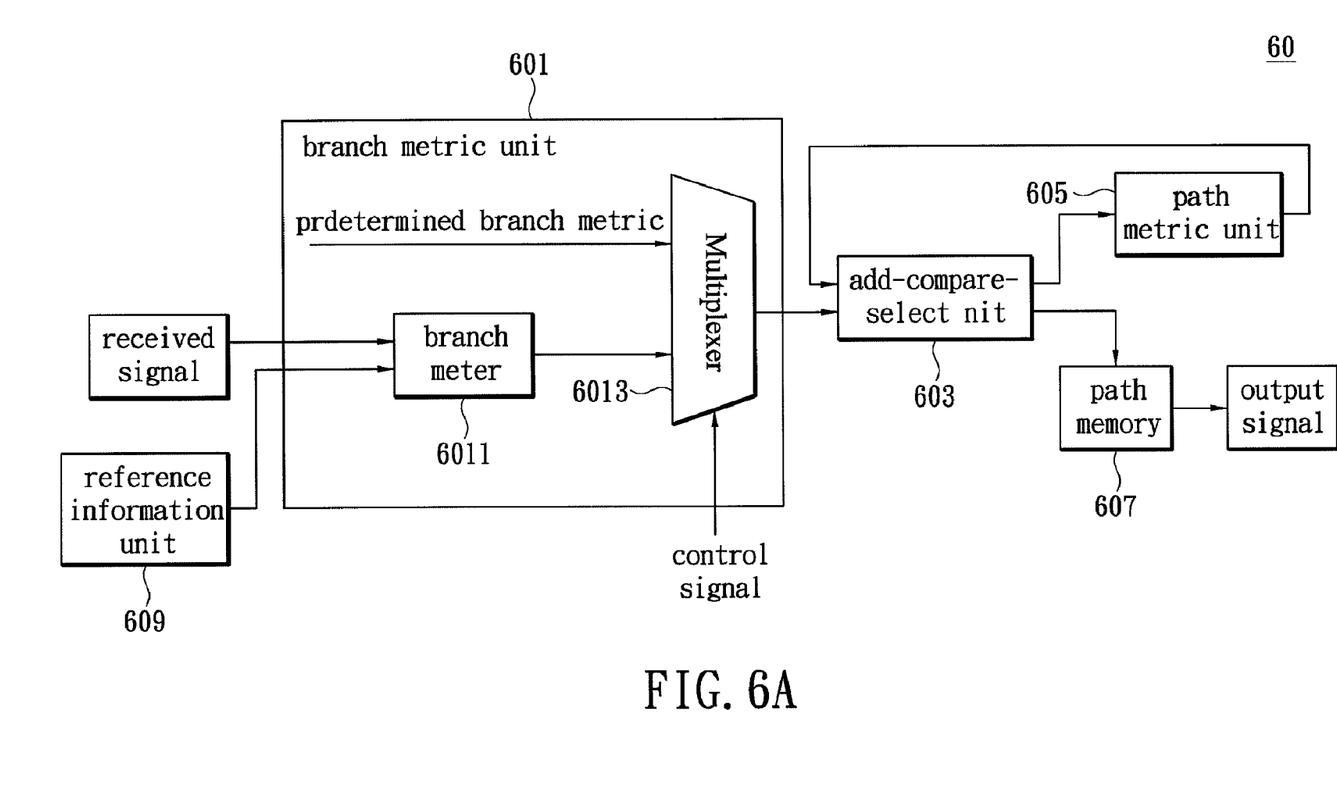
FIG. 6A is a system block diagram of an apparatus for maximum likelihood signal detection according to a first embodiment of the invention.

FIG. 6A is a system block diagram of an apparatus for maximum likelihood signal detection according to a first embodiment of the invention. As shown in FIG. 6A, an apparatus of maximum likelihood signal detection 60 of the invention includes a branch metric unit 601, an add-compare-select unit 603, a path metric unit 605, a path memory 607 and a reference information unit 609. The branch metric unit 601 further includes a branch meter 6011 and a multiplexer (mux) 6013.

The branch metric unit 601 receives a reference signal level outputted by the reference information unit 609 and a sampled signal read from an optical disc to obtain a first branch metric, and then outputs the first branch metric to the add-compare-select unit 603. The sampled signal of data read from the optical disc and the reference signal level are first sent to the branch meter 6011 to get a second branch metric, and the second branch metric is transmitted to the mux. 6013. The mux. 6013 then outputs the second branch metric or a predetermined branch metric to be the first branch metric according to a control signal.

It should be noted that the system of the invention will set the control signal, i.e., adjust the control signal according to different channel responses, coding constraints or channel memory lengths. For example, if the system of the invention read signals from an optical disc with a channel memory length n=3 and a coding constraint d=2, the control signal can drive the mux. 6013 to select the predetermined branch metric which will cause the add-compare-select unit 603 do not select this branch connection so as to mask the unnecessary branch connection (i.e., those branch connections not belonging to the trellis diagram with a channel memory length n=3 and a coding constraint d=2). The predetermined branch metric can be set to, for example, a large enough value or a small enough value so that the add-compare-select unit 603 will not select the masked branch connections after performing the addition and comparison actions.

The add-compare-select unit 603 performs the addition, comparison and selection actions to obtain a survival path metric and transmits the survival path metric to the path metric unit 605 for further updating the path metric stored in the path metric unit 605.

The add-compare-select unit 603 retrieves the latest path metric from the path metric unit 605 to perform the addition, comparison and selection actions after receiving the next branch metric and further generates the next survival path metric. Besides, the add-compare-select unit 603 also sends a determination result signal (i.e., a determination bit) to the path memory 607 to update the survival path stored in the path memory 607. Next, the path memory 607 will output the path data that has been finally confirmed to a next-stage device for follow-up data processing.

Figure 6B:
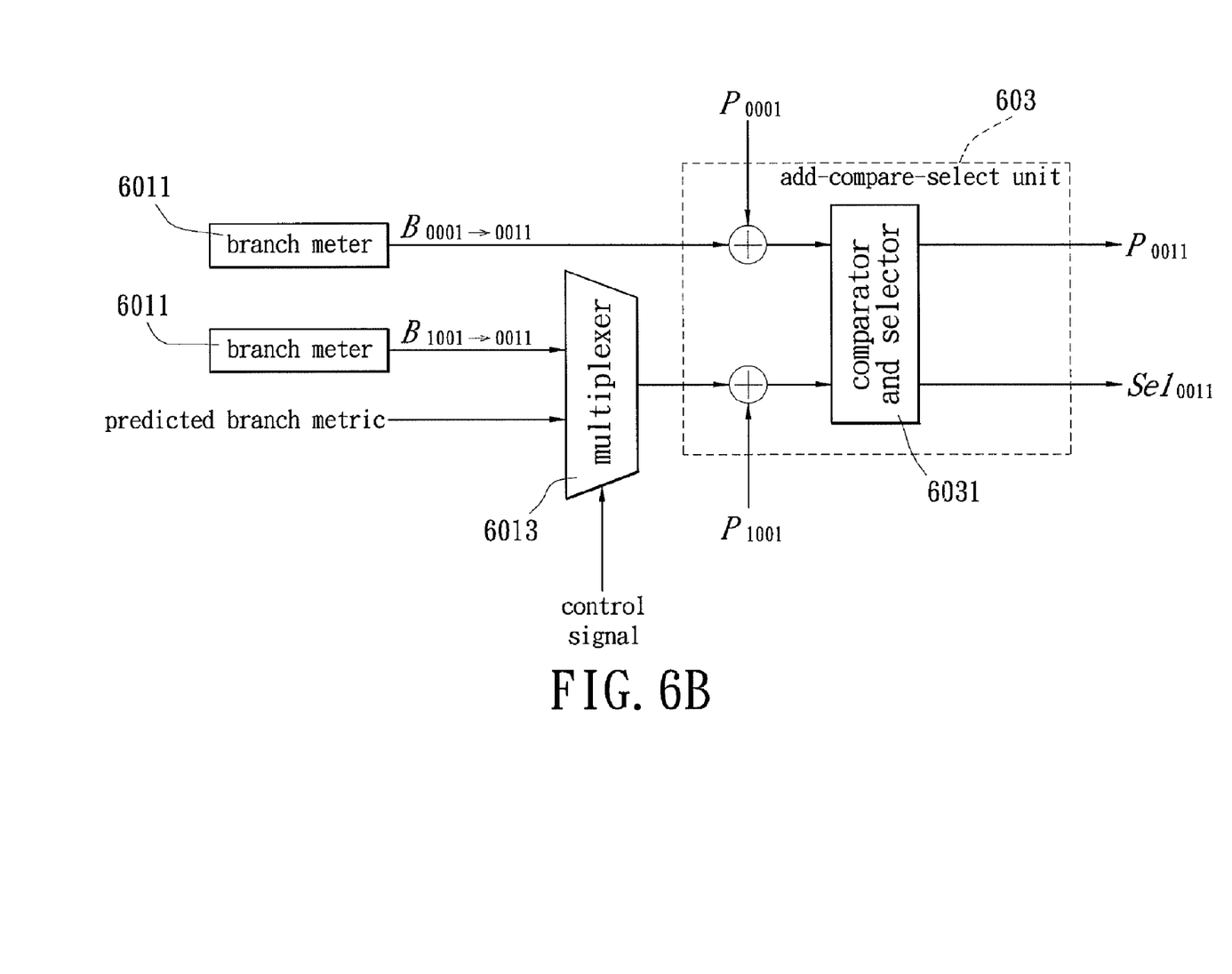
FIG. 6B is a more detailed system block diagram for an apparatus of maximum likelihood signal detection according to the first embodiment of the invention.

FIG. 6B is a more detailed description to the system block diagram of the apparatus for maximum likelihood signal detection according to the first embodiment of the invention. As shown in FIG. 6B, the sampled signal of data read from the optical disc and the reference signal are first transmitted to the branch meter 6011 to generate a second branch metric which further includes a branch metric $B_{0001 \to 0011}$ and a branch metric $B_{1001 \to 0011}$. The branch metric $B_{1001 \to 0011}$ and a predetermined branch metric are sent to the mux. 6013. The mux. 6013 will output the branch metric $B_{1001 \to 0011}$ or the predetermined branch metric to a add-compare-select 603 according to a control signal. The output of the mux. 6013 then transfer to an adder to perform an addition action with a survival path metric $P_{1001}$ retrieved from the path metric unit 605, and then, transfer the addition result to the compared-selector 6031. On the other hand, the branch metric $B_{0001 \to 0011}$ also added with a survival path metric $P_{0001}$ retrieved from the path metric unit 605, then the addition result will also be sent to the compared-selector 6031. Finally, the compared-selector 6031 will generate a latest survival path metric $P_{0011}$ and a determination result signal $Sel_{0011}$. The latest survival path metric $P_{0011}$ will be transfer to the path metric unit 605 and the determination result signal $Sel_{0011}$ will be transfer to the path memory 607 to update the survival path stored in the path memory 607.

Figure 7:
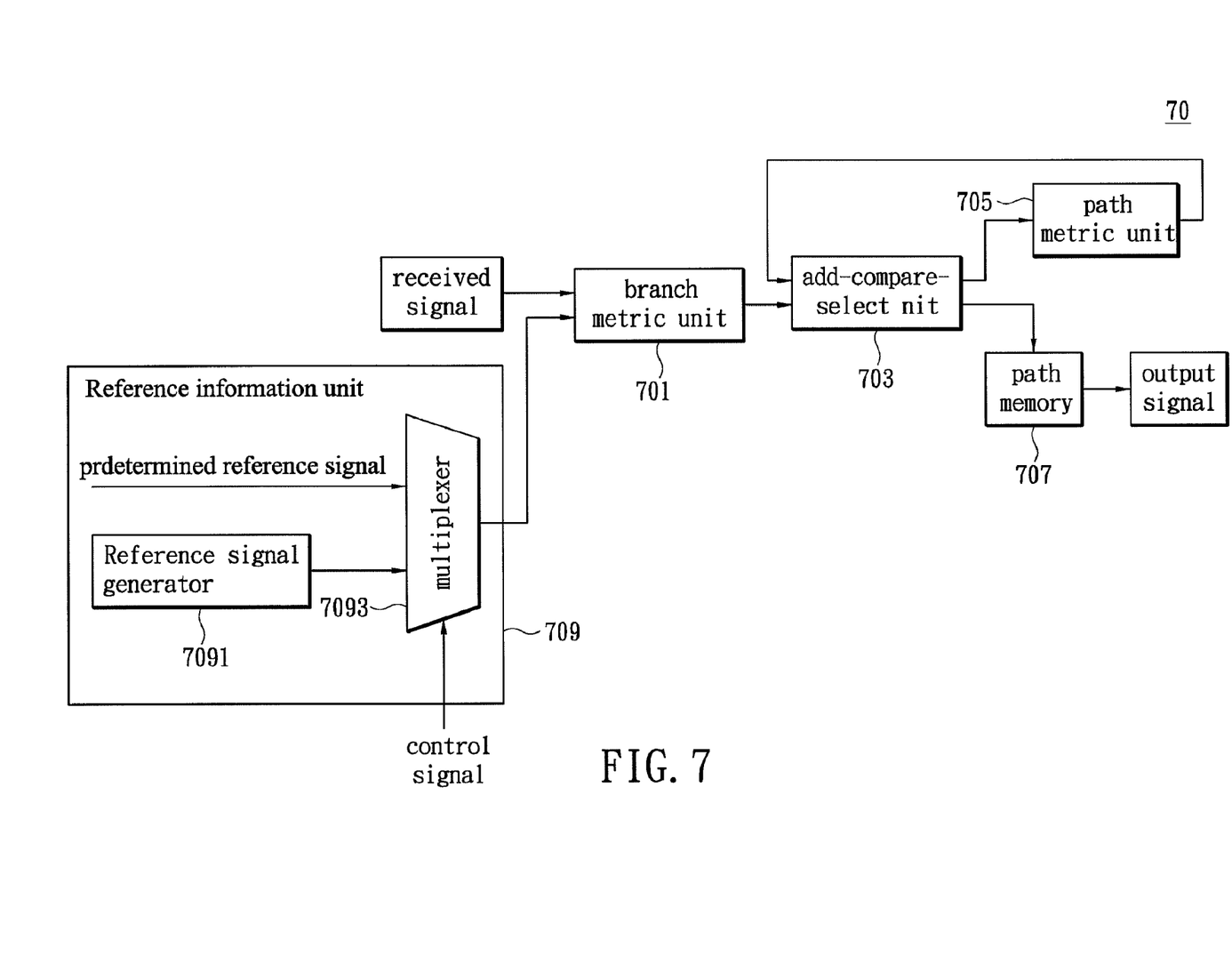
FIG. 7 is a system block diagram of an apparatus for maximum likelihood signal detection according to a second embodiment of the invention.

FIG. 7 is a system block diagram of an apparatus for maximum likelihood signal detection according to a second embodiment of the invention. As shown in FIG. 7, an apparatus for maximum likelihood signal detection of the invention 70 includes a branch metric unit 701, an add-compare-select unit 703, a path metric unit 705, a path memory 707 and a reference information unit 709. The reference information unit 709 further includes a reference signal generator 7091 and a multiplexer (mux) 7093.

The branch metric unit 701 receives a first reference signal output by the reference information unit 709 and sampled signal of data read from an optical disc to obtain a branch metric, and outputs the branch metric to the add-compare-select unit 703. The reference signal generator 7091 of the reference information unit 709 generate a second reference signal according to the sampled signal of data read from the optical disc and transmit the second reference signal to the mux. 7093. The mux. 7093 then selectively outputs the second reference signal or a predetermined reference signal to be the first reference signal according to a control signal.

It should be noted that the system of the invention will set the control signal, i.e., adjust the control signal according to different channel responses, coding constraints or channel memory lengths. For example, if the system of the invention reads data of the optical disc with a channel memory length n=3 and a coding constraint d=2, the control signal can drive the mux. 7093 to select the predetermined reference signal which will cause the add-compare-select unit 703 do not select this branch connection so as to mask the unnecessary branch connections (i.e., those branch connections not belonging to the trellis diagram with a channel memory length n=3 and a coding constraint d=2). The predetermined reference signal can be set to, for example, a large enough (or small enough) value so that the branch metric unit 701 will generate a large enough branch metric and therefore the add-compare-select unit 703 will not select the masked branch connections after performing the addition and comparison actions.

After the add-compare-select unit 703 receives the branch metric, it will perform the addition, comparison and selection actions to generate a survival path metric and transmit the survival path metric to the path metric unit 705 so as to update the path metric stored in the path metric unit 705.

After the add-compare-select unit 703 receives the next branch metric, it will retrieve the latest path metric from the path metric unit 705 to perform the addition, comparison and selection actions so as to generate the next survival path metric. Besides, the add-compare-select unit 703 will also send its determination result signal (i.e., a determination bit) to the path memory 707 to update the survival path stored in the path memory 707. Next, the path memory 707 will output the path data that has been finally confirmed to a next-stage device for follow-up data processing.

Figure 8:
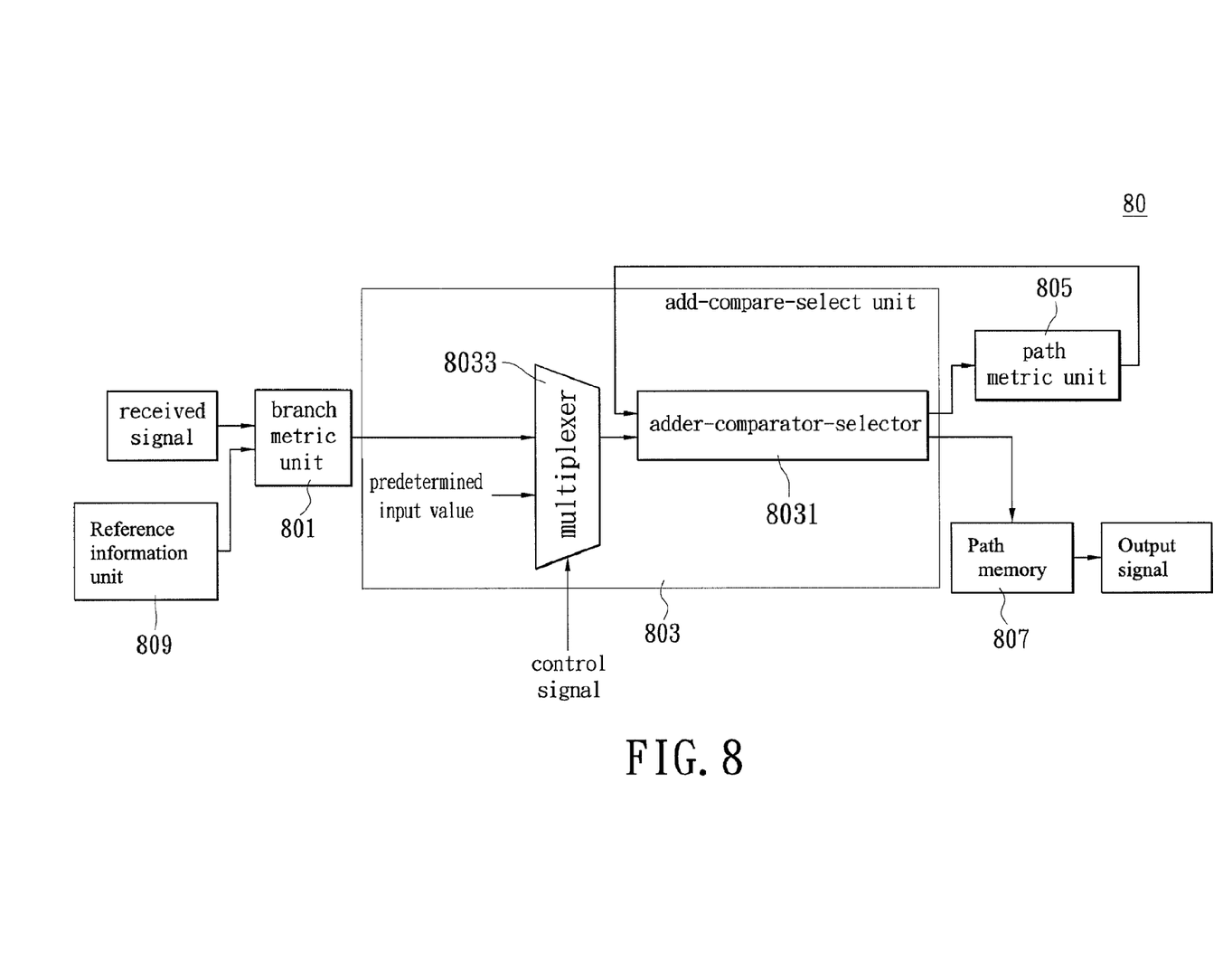
FIG. 8 is a system block diagram of an apparatus for maximum likelihood signal detection according to a third embodiment of the invention.

FIG. 8 is a system block diagram of an apparatus for maximum likelihood signal detection according to a third embodiment of the invention. As shown in FIG. 8, an apparatus for maximum likelihood signal detection of the invention 80 comprises a branch metric unit 801, an add-compare-select unit 803, a path metric unit 805, a path memory 807 and a reference information unit 809. The add-compare-select unit 803 further includes an adder-comparator-selector 8031 and a mux. 8033.

The branch metric unit 801 receives a reference signal outputted by the reference information unit 809 and a sampled signal corresponding to data read from an optical disc to obtain a branch metric, and outputs a branch metric to the mux. 8033 in the add-compare-select unit 803. The mux. 8033 outputs the branch metric or a predetermined input value to the adder-comparator-selector 8031 according to a control signal.

It should be noted that the system of the invention will set the control signal, i.e., adjust the control signal according to different channel responses, coding constraints or channel memory lengths. For example, if the system of the invention reads data of the optical disc with a channel memory length $n=3$ and a coding constraint $d=2$, the control signal can drive the mux. 8033 to output the predetermined input value which will cause the adder-comparator-selector 8031 do not select this branch connection so as to mask the unnecessary branch connections (i.e., those branch connections not belonging to the trellis diagram with a channel memory length $n=3$ and a coding constraint $d=2$). The predetermined input value can be set to, for example, a large enough value or a small enough value so that the adder-comparator-selector 8031 will not select the masked branch connections after performing the addition and comparison actions.

Next, the add-compare-select unit 803 will generate a survival path metric and transmit the survival path metric to the path metric unit 805 so as to update the path metric stored in the path metric unit 805. Besides, the add-compare-select unit 803 will also send a determination result signal (i.e., a determination bit) to the path memory 807 to update the survival path stored in the path memory 807. Next, the path memory 807 will output the path data that has been finally confirmed to a next-stage device for follow-up data processing.

Figure 9A:
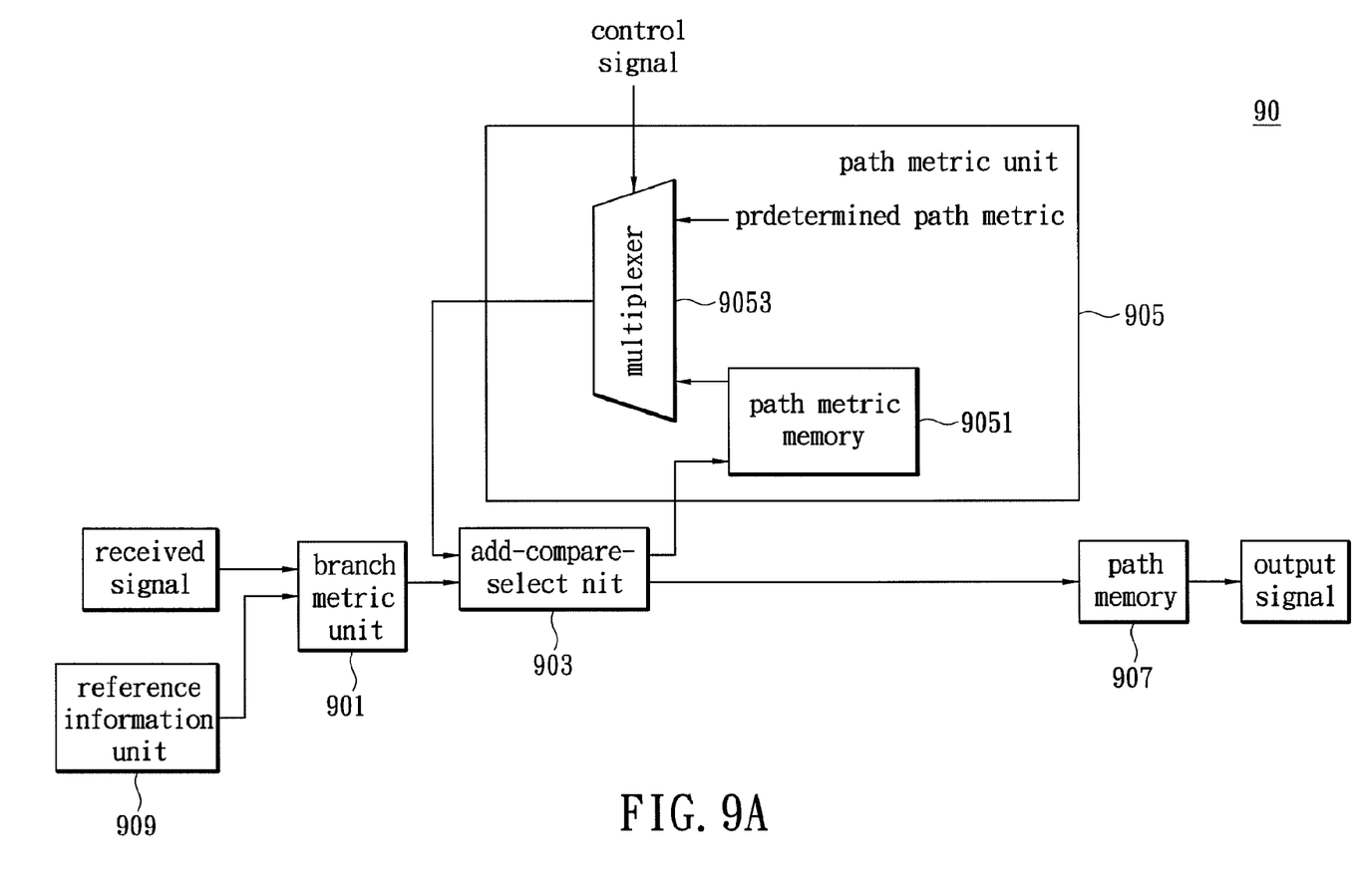
FIG. 9A is a system block diagram of an apparatus for maximum likelihood signal detection according to a fourth embodiment of the invention.

FIG. 9A is a system block diagram of an apparatus for maximum likelihood signal detection according to a fourth embodiment of the invention. As shown in FIG. 9A, an apparatus for maximum likelihood signal detection of the invention 90 comprises a branch metric unit 901, an add-compare-select unit 903, a path metric unit 905, a path memory 907 and a reference information unit 909. The path metric unit 905 further comprises a path metric memory 9051 and a multiplexer (mux) 9053.

The branch metric unit 901 receives a reference signal outputted by the reference information unit 909 and a sampled signal corresponding to data read from an optical disc to obtain a branch metric, and outputs the branch metric to the add-compare-select unit 903. The reference information unit 909 will calculate out a corresponding reference signal according to the sampled signal of data read from the optical disc.

After the add-compare-select unit 903 receives the branch metric, it will perform the addition, comparison and selection actions to generate a survival path metric and transmit the survival path metric to the path metric unit 905 so as to update the path metric stored in the path metric memory 9051 of the path metric unit 905. After the add-compare-select unit 903 receives the next branch metric, it will retrieve the latest path metric from the path metric unit 905 to perform the addition, comparison and selection actions so as to generate the next survival path metric. Besides, the add-compare-select unit 903 will also send its determination result signal (i.e., a determination bit) to the path memory 907 to update the survival path stored in the path memory 907. Next, the path memory 907 will output the path data that has been finally confirmed to a next-stage device for follow-up data processing.

The mux. 9053 of the path metric unit 905 determines to output the path metric provided by the path metric memory 9051 or a predetermined path metric according to a control signal. It should be noted that the system of the invention will set the control signal, i.e., adjust the control signal according to different channel responses, coding constraints or channel memory lengths. For example, if the system of the invention reads data of the optical disc with a channel memory length $n=3$ and a coding constraint $d=2$, the control signal can drive the mux. 9053 to select the predetermined path metric which will cause the add-compare-select unit 903 do not select this branch connection so as to mask the unnecessary branch connections (i.e., those branch connections not belonging to the trellis diagram with a channel memory length $n=3$ and a coding constraint $d=2$). The predetermined path metric can be set to, for example, a large enough value or a small enough value so that the add-compare-select unit 903 will not select the masked branch connections after performing the addition and comparison actions.

Figure 9B:
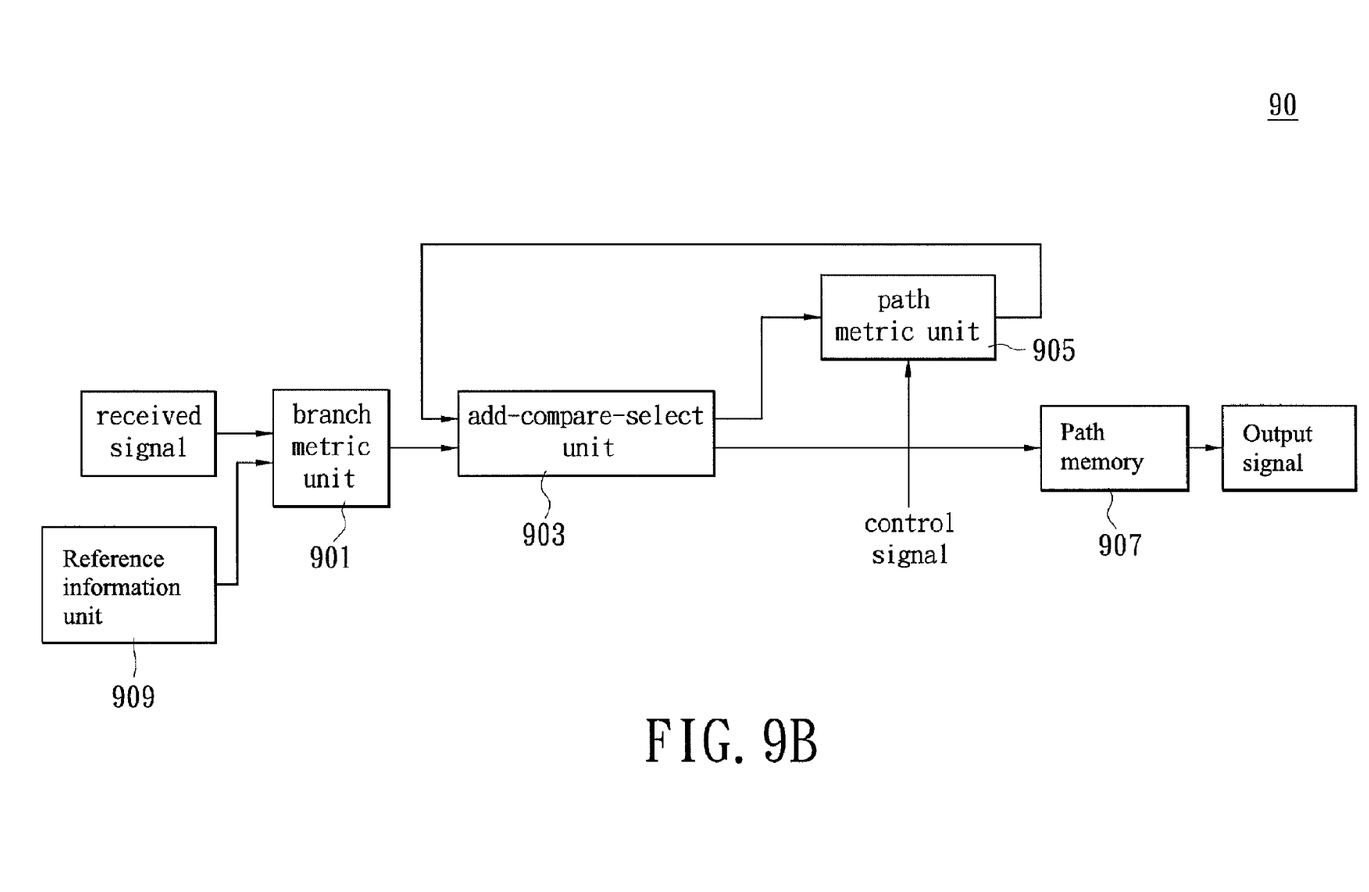
FIG. 9B is another system block diagram of an apparatus for maximum likelihood signal detection according to the fourth embodiment of the invention.

The embodiment in FIG. 9A selectively changes the path metric according to the control signal by using the mux. As shown in FIG. 9B, this can also be accomplished by directly update the stored path metric in the path metric memory 9051 to be the predetermined path metric according to the control signal. FIG. 9B is another system block diagram of an apparatus for maximum likelihood signal detection according to the fifth embodiment of the invention. It should be noted that the system of the invention will set the control signal, i.e., adjust the control signal according to different channel responses, coding constraints or channel memory lengths.

Figure 10A:
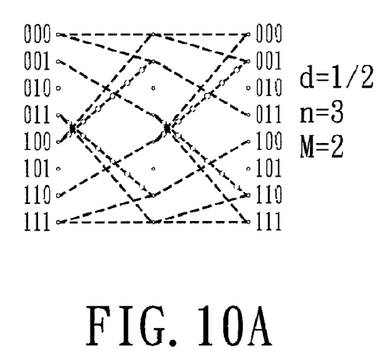
FIGS. 10A and 10B are trellis diagrams of the invention with a channel memory length n=3, a coding constraint d=1/2 and a number of read bit M=2.
Figure 10B:
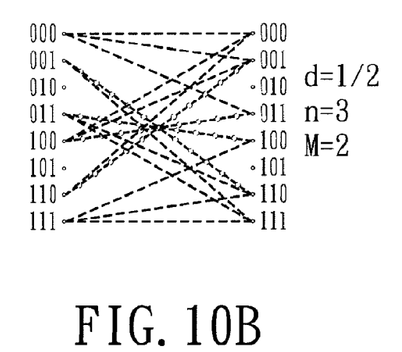
Figure 11A:
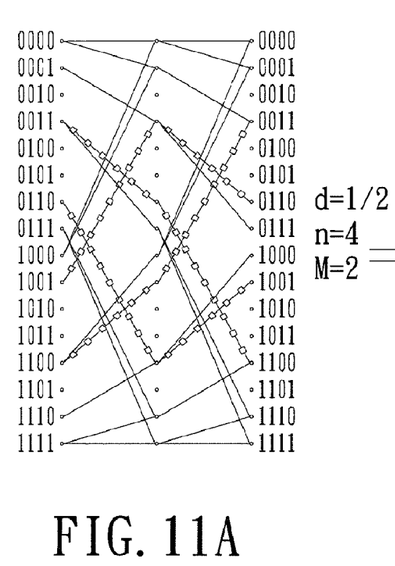
FIGS. 11A and 11B are trellis diagrams of the invention with a channel memory length n=4, a coding constraint d=1/2 and a number of read bit M=2.

In order to enhance the data reading efficiency of the optical system, the invention further combines trellis diagrams generated by the reading signal of the optical disc so that the apparatus for maximum likelihood signal detection of the invention can read two-bit data each time. FIGS. 10A and 10B are trellis diagrams of the invention with a channel memory length $n=3$, a coding constraint $d=1/2$ and a number of read bit $M=2$. As shown in FIG. 10A, when the apparatus for maximum likelihood signal detection of the invention carries out reading of two-bit data, it has to perform the data determination twice time. In order to enhance the efficiency of data reading, however, the invention provides trellis diagrams with a number of read bit $M=2$ shown in FIG. 10B. According to the trellis diagram shown in FIG. 10B, the apparatus for maximum likelihood signal detection of the invention requires only one time of the data determination for reading of two-bit data. Similarly, the trellis diagrams with a channel memory length n=4, coding constraints d=1/2 and a number of read bit M=2 can be provided as shown in FIGS. 11A and 11B.

Of course, the invention can further be extended to an apparatus for maximum likelihood signal detection capable of reading three or more-bit data each time. Therefore, the invention is not limited to the above embodiments, and can be designed according to the practical necessity of the user.

Figure 11B:
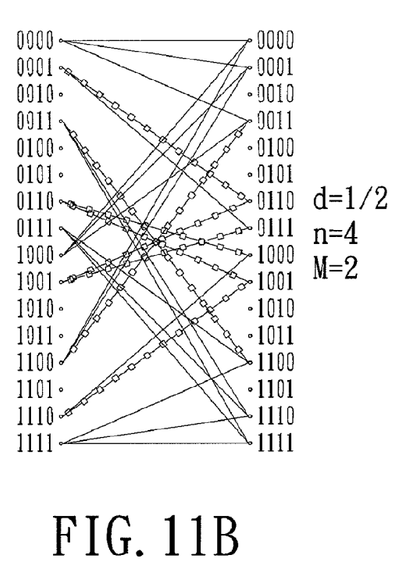
Figure 12:
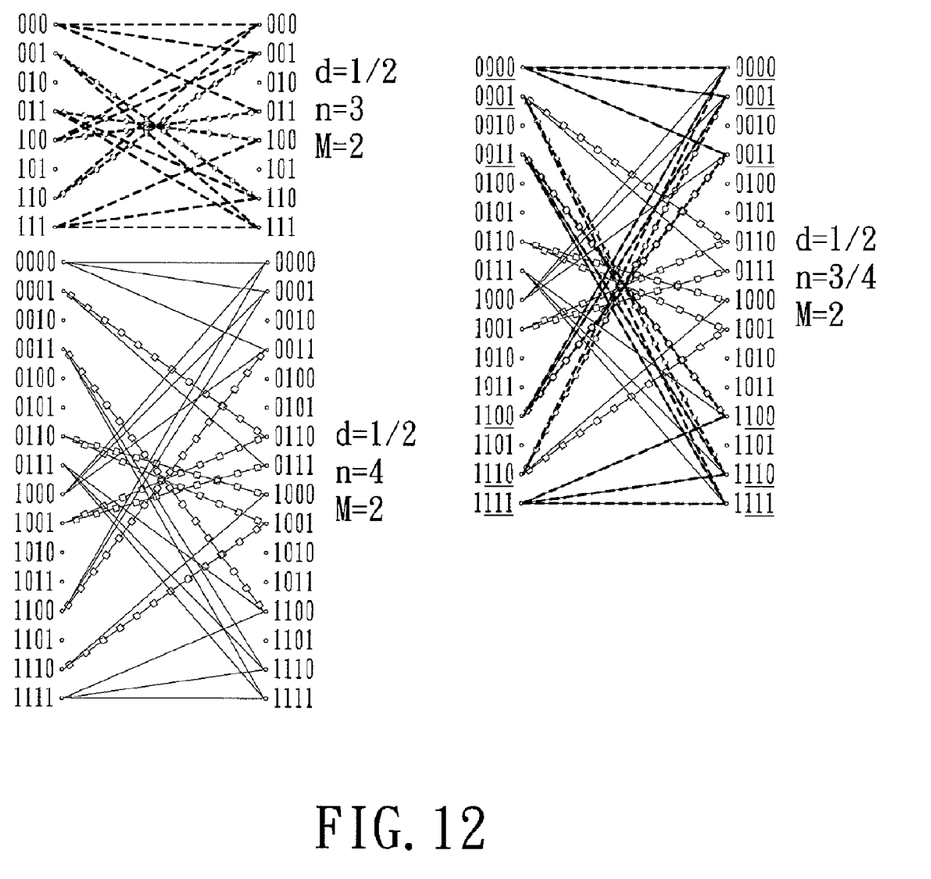
FIG. 12 is a trellis diagram of the invention with a channel memory length n=3/4, a coding constraint d=1/2 and a number of read bit M=2.
Figure 13:
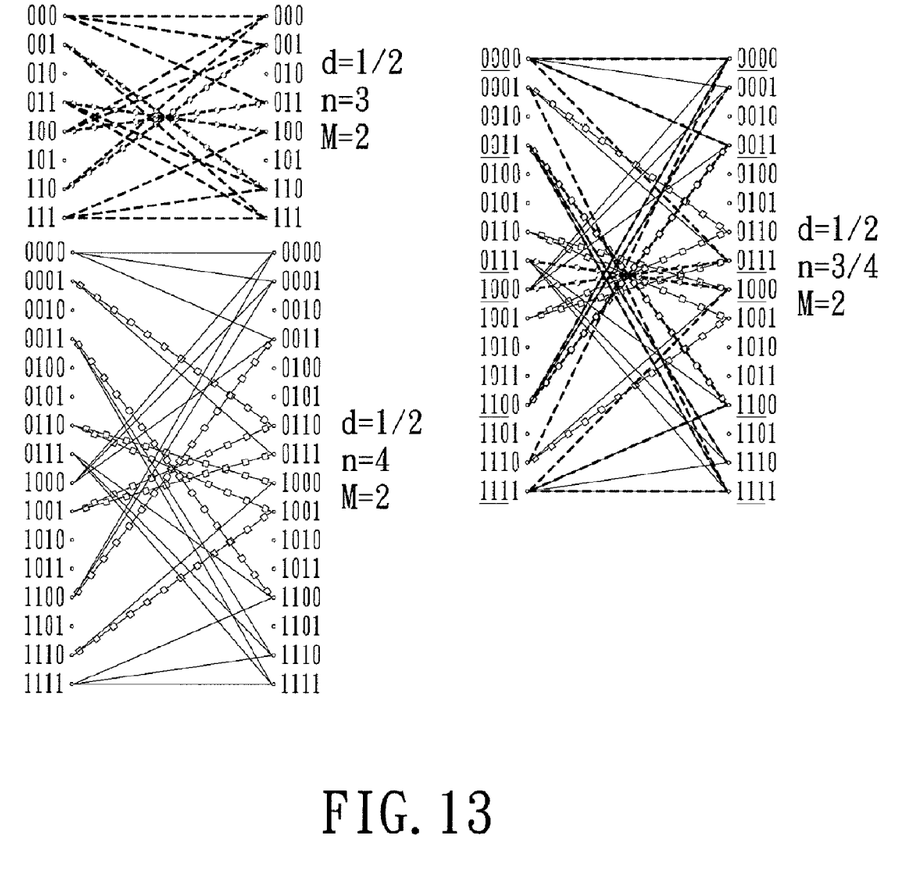
FIG. 13 is another trellis diagram of the invention with a channel memory length n=3/4, a coding constraint d=1/2 and a number of read bit M=2.
Figure 14:
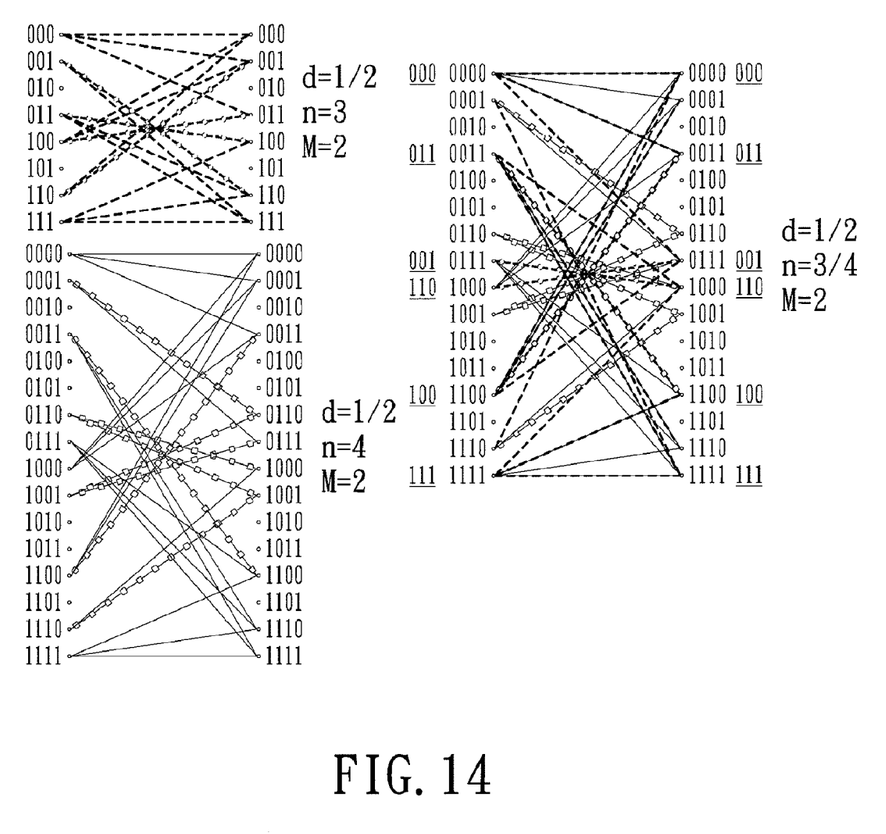
FIG. 14 is yet another trellis diagram of the invention with a channel memory length n=3/4, a coding constraint d=1/2 and a number of read bit M=2.

In order to make the apparatus for maximum likelihood signal detection of the invention be able to read two-bit data simultaneously and apply to optical discs with different channel memory lengths, the trellis diagrams in FIGS. 10B and 11B are further combined, as shown in FIGS. 12, 13 and 14. FIGS. 12 and 13 provide a preferred combining manner because their maximum number of branch connections toward the data state of the second time point is equal to 4, while that of FIG. 14 is equal to 5.

The architecture of the first to fifth embodiments can generally be used for data reading actions of the trellis diagram shown in FIGS. 12, 13 and 14. The difference is primarily the number of branch connections toward the data state at the second time point. Therefore, the add-compare-select unit has to compare three or more path metrics for determining two-bit data.

Although the invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. An apparatus for decoding an input signal comprising:
a branch metric unit for receiving the input signal and a predetermined branch metric, wherein the branch metric unit comprises a branch meter for generating a second branch metric according to the input signal and a reference signal, and the branch metric unit selectively outputs one of the predetermined branch metric and the second branch metric as a first branch metric according to a control signal;
a path metric unit for providing a path metric; and
an add-compare-select unit, receiving the first branch metric and the path metric, for performing addition, comparison and selection operations to generate a survival path metric and a determination result signal;
wherein the control signal is utilized to control the branch metric unit to achieve a desired decoding type.

2. The apparatus for decoding an input signal as claimed in claim 1, wherein the apparatus further comprises:
a reference information unit for generating the reference signal;
wherein the branch meter generates the second branch metric according to the input signal and the reference signal.

3. The apparatus for decoding an input signal as claimed in claim 1, wherein the control signal is adjusted according to the corresponding condition of the input data, wherein the corresponding condition comprises channel response, coding constraint or channel memory length of the input signal.

4. The apparatus for decoding an input signal as claimed in claim 1, wherein the control signal is adjusted according to the number of the read bit of the decoder.

5. A method for decoding an input signal of a maximum likelihood decoder, wherein the maximum likelihood decoder comprises a branch metric unit, a path metric unit, and an add-compare-select unit, the method comprising:
receiving the input signal and a predetermined branch metric by the branch metric unit; generating a second branch metric according to the input signal and a reference signal;
selectively outputting one of the predetermined branch metric and the second branch metric as a first branch metric according to a control signal;
providing a path metric by the path metric unit; and
receiving the first branch metric and the path metric for performing addition, comparison and selection operations by the add-compare-select unit to generate a survival path metric and a determination result signal;
wherein the control signal is utilized to control the branch metric unit to achieve a desired decoding type.

6. The method for decoding an input signal as claimed in claim 5, wherein the maximum likelihood decoder further comprises a reference information unit, and the method further comprises:
generating the reference signal by the reference information unit;
wherein the second branch metric is generated according to the input signal and the reference signal.

7. The method for decoding an input signal as claimed in claim 5, wherein the control signal is adjusted according to the corresponding condition of the input data, wherein the corresponding condition comprises channel response, coding constraint, or channel memory length of the input signal.

8. The method for decoding an input signal as claimed in claim 5, wherein the control signal is adjusted according to the number of the read bit of the decoder.

* * * * *